United States Patent [19]

Daugherty

[11] Patent Number: 4,963,039
[45] Date of Patent: Oct. 16, 1990

[54] VIBRATION REDUCING THRUST BEARING

[75] Inventor: Thomas L. Daugherty, Arnold, Md.

[73] Assignee: The United States of America as represented by the Secretary of the Navy, Washington, D.C.

[21] Appl. No.: 406,410

[22] Filed: Sep. 13, 1989

[51] Int. Cl.$^5$ .................. F16C 27/08; F16C 17/06
[52] U.S. Cl. ................................ 384/224; 384/308
[58] Field of Search ............ 384/215, 223, 224, 122, 384/124, 303–308

[56] References Cited

U.S. PATENT DOCUMENTS

| | | | |
|---|---|---|---|
| 1,425,979 | 8/1922 | Kingsbury | 277/34 X |
| 1,444,839 | 2/1923 | Kingsbury et al. | 384/224 |
| 1,444,840 | 2/1923 | Kingsbury et al. | 384/224 |
| 1,444,841 | 2/1923 | Kingsbury et al. | 384/224 |
| 2,274,764 | 3/1942 | Yeomans | 384/224 |
| 3,007,749 | 11/1961 | De Guerin | 384/303 |
| 3,062,598 | 11/1962 | Summers | 384/224 X |
| 3,132,908 | 5/1964 | Grotzinger | 384/224 X |
| 3,160,450 | 12/1964 | Gentiluomo | 384/308 |
| 3,930,691 | 1/1976 | Greene | 384/224 |

Primary Examiner—Thomas R. Hannon
Attorney, Agent, or Firm—Lurther A. Marsh; John H. Stowe

[57] ABSTRACT

A thrust bearing for vibration reduction application which isolates the thrust shoes so that transmissions of vibrations induced by drag on the thrust shoes are attenuated or avoided. A thrust shoe carrier isolates the thrust shoes from the relatively stationary platform in which the bearing operates by providing a damped spring system with relatively low stiffness in the axial direction and relatively high stiffness in the torsional and radial directions.

18 Claims, 1 Drawing Sheet

VIBRATION REDUCING THRUST BEARING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention relates to thrust bearings and more particularly to thrust bearings adapted to reduce the transmission of energy from the rotating shaft to the foundation or structure within which the bearing operates.

2. Background Information

A typical thrust bearing of the Kingsbury type such as for example U.S. Pat. Nos. 1,425,979 and 1,444,839, the disclosures of which are hereby incorporated by reference, include a collared shaft rotating within a stationary platform. A plurality of sector like shoes are mounted in a carrier which is mounted in the stationary platform. The sector like shoes are adapted to be thrust by means such as a hydraulic power source acting through axially movable pistons to press against the collar on the shaft to compensate for axial thrust that may be present along the axis of the shaft. Typically, the pistons are supported by pressurized fluid through a manifold, piping and several fluid flasks and a thin film of fluid separates the collar face and the shoes. The fluid system provides mass, stiffness, and damping properties to the shafting system which can in turn be tuned to provide vibration damping at certain frequencies. This arrangement is generally called a vibration reducer mechanism.

A thrust bearing is subjected to both constant axial thrust loads and cyclic thrust loads resulting from constant and cyclic end loads on the shaft. For a vibration reducer mechanism to operate properly, the path of load should be from the shaft collar through the fluid film into the thrust shoe to the vibration reducer piston through the fluid and into the thrust bearing housing. Residual vibration components are also transmitted to the stationary platform via the thrust bearing foundation where the cyclic component can stimulate vibrations of the stationary platform. Such vibrations can then be undesirably transferred into the surrounding medium causing noise or damaging vibrations in surrounding areas.

Thrust shoes, usually six to eight in number currently represent a direct path and therefore a vibration or sound short to the bearing housing due to their mounting arrangement. Each thrust shoe is positioned by metal to metal contact with the housing and the housing supports the weight of the shoes, torsional reactions and drag due to allowed bearing misalignment. Depending on the application of the bearing, total drag forces from these sources can be substantial.

There is a need for a thrust bearing shoe carrier that isolates the drag forces from the bearing housing and consequently isolates these drag forces from the stationary housing in which the bearing is located.

SUMMARY OF THE INVENTION

The present invention is intended for decoupling, mitigating or attenuating vibrations and vibration inducing energy which may be transmitted between a rotating collared shaft and a relatively stationary platform within which the shaft is rotating. A thrust bearing in accordance with the present invention comprises a plurality of thrust shoes for applying thrust in a direction substantially along the axis of said shaft. The thrust shoes are preferably responsive to forces from a fluid driving system that is adaptive to absorb the static thrust and some of the cyclic components. A thrust shoe carrier frame positions the shoes adjacent to the collar of the rotating shaft. The shoe carrier frame is isolated from the stationary platform by a damped spring system that simultaneously provides properties of relatively high stiffness in radial and torsional directions with respect to the shaft and relatively low stiffness in the axial direction of the shaft. Preferably, the carrier frame includes at least one pair of radially extending ears and the damped spring system is interposed between the ears and the platform. Preferably, the damped spring system is a slab of elastomeric material and more preferably the elastomeric material is rubber. Alternately, the damped spring system is a plurality of laminated layers of elastomeric material.

It is an object of the present invention to provide a thrust bearing that resists the transmission of vibrations and other cyclic loads into the relatively stationary platform within which the bearing is mounted.

It is a further object of the present invention to provide a thrust shoe carrier that may be interposed between a collared shaft and a stationary platform where the transmission of vibration and vibration inducing energy through the carrier and into a stationary platform is reduced.

Other objects, advantages and novel features of this invention will become apparent from the following detailed description of the invention when considered in conjunction with the accompanying drawings.

DETAILED DESCRIPTION OF THE INVENTION

Figure 1:
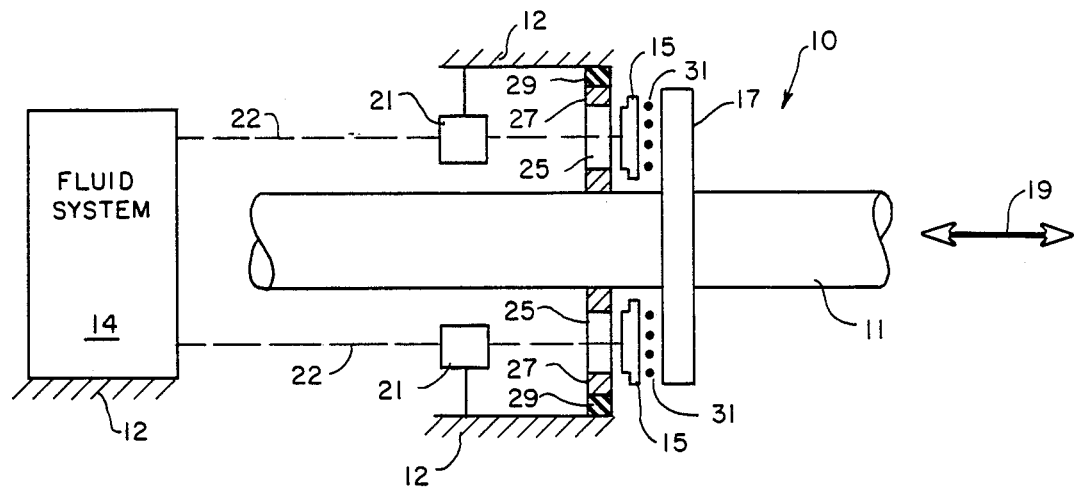
FIG. 1 is a diagram showing the general arrangement of a thrust bearing of the invention.

Referring now to FIG. 1, a thrust bearing of the present invention is functionally illustrated generally as 10. Shaft 11 is journaled by bearing means (not shown) to rotate in a stationary platform 12. A plurality of thrust shoes 15 are adapted to press against thrust collar 17 for the purpose of counteracting forces along the axis of shaft 11 generally in the directions indicated by 19. Thrust shoes 15 are driven by pistons 21 which are responsive to fluid system 14 along lines indicated by 22 in a conventional manner.

Thrust shoes 15 are supported with respect to platform 12 by thrust shoe carrier 25 (See FIG. 2) further comprising carrier frame 27 and a plurality of isolators 29 such that thrust shoes 15 are isolated from platform 12. Isolators 29 are interposed between thrust shoe carrier frame 27 and platform 12 in such manner that high stiffness is obtained in the radial and torsional directions while stiffness in the axial direction is comparatively low. Isolator 29 is preferably a damped spring system that simultaneously provides the properties of high stiffness in the radial and torsional directions and low stiffness in the axial direction. Preferably isolator 29 is a slab of elastomeric material, more preferably rubber. The type of rubber is selected to be compatible with lubricants used in the bearing system. The elastic properties of the rubber are dependent on the performance characteristics. Isolators 29 are made from a homogeneous material but alternately are made from more than one layer of rubber with the layers 43 and 45 being bonded together by an adhesive 47. The layers may have the same, similar or different characteristics. An advantage of a multi-layered isolator is that the characteristics of the isolator are readily adapted to different design conditions. The essential characteristic of either a homogenous slab isolator or a laminated slab isolator are that low stiffness along an axis parallel to the rotating shaft and high stiffness in the radial and torsional directions are maintained.

A thin film of fluid indicated by 31 is interposed between thrust shoes 15 and collar 17. Even though this interface is lubricated, vibrations induced by drag forces are transmitted into carrier ring 27. The low axial stiffness provides an attenuation path of cyclic vibrations caused by thrust shoe drag forces. When rubber is used as the material for isolator 29, the required high stiffness is accomplished by using rubber in compression and the required low stiffness is obtained using the rubber in shear. Thrust bearing shoe carrier 25 enables the rubbing forces due to thrust shoe weight, torsional forces and misalignment to be decoupled from the housing while allowing the cyclic components of axial forces to be transmitted into adaptive fluid system 14 through pistons 21 such that many such cyclic components are attenuated before reaching stationary platform 12.

Figure 2:
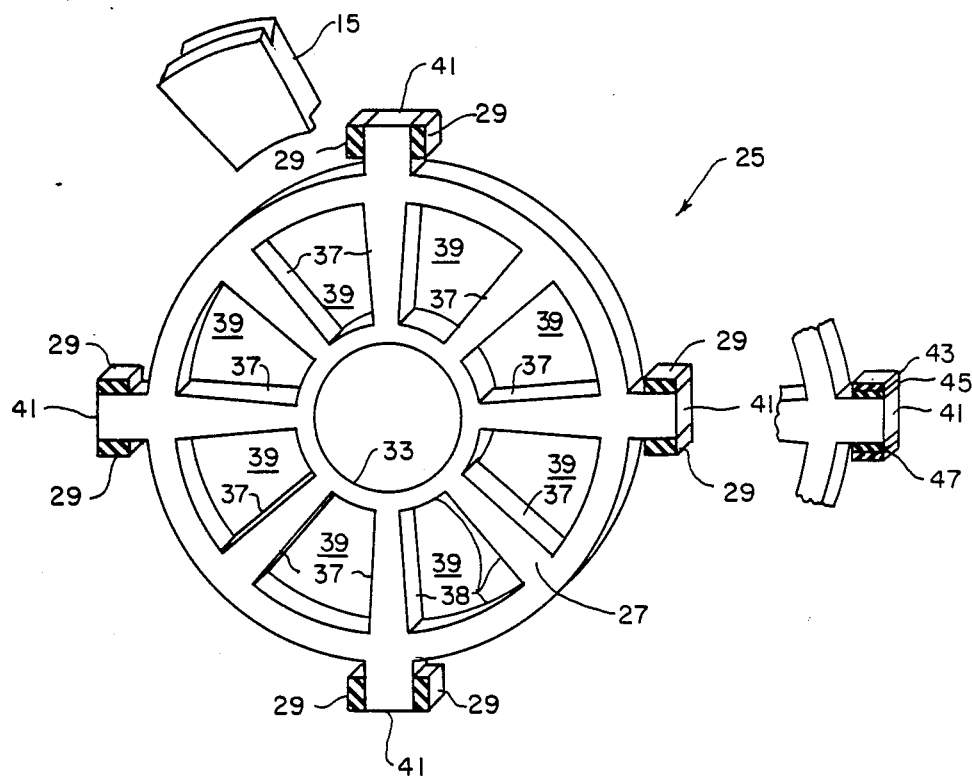
FIG. 2 illustrates a carrier shoe frame adapted with a damped spring system of the preferred embodiment of the invention.

Referring now to FIG. 2, a more detailed illustration of the preferred embodiment of thrust shoe carrier 25 is shown. Thrust shoe carrier 25 preferably comprises carrier frame 27 and a plurality of isolators 29 which serve as a damped spring system, each isolator being a system of its own and the plurality of isolators forming a composite damped system. Isolators 29 are secured to stationary platform 12 as indicated in FIG. 1 by suitable means such as capture or preferably by adhesive bonding. The location of support ears 41 may be varied from that inferred by the drawings and the number of ears may be varied provided that low stiffness along an axis parallel to the rotating shaft combined with high stiffness in the radial and torsional directions is maintained.

Carrier frame 27 preferably comprises radially inward ring 33 adapted to clear a shaft 11 as shown in FIG. 1. A radially outward ring 35 is substantially concentric with inward ring 33. A plurality of radially extending members 37 connect inward ring 33 with outward ring 35 forming shoe pockets 39. Shoe pockets 39 are each adapted to receive one of a plurality of thrust shoes 15. One shoe 15 is shown in FIG. 2 and is representative of each of a plurality of shoes 15, one shoe 15 being in each pocket 39. Affixed to the outer periphery of outward ring 35 are a plurality of support ears 41. Support ears 41 are preferably disposed in symmetrically opposite pairs. At least one isolator 29 is adapted to each ear 41 by suitable means such as for example, adhesive bonding. Carrier frame 27 is made from any suitable material, preferably a low weight material. Where the material for carrier frame 27 is not inherently a low friction material, walls 38 of each shoe pocket 39 are preferably coated with a suitable material to reduce friction coefficients between the contacting surfaces of each thrust shoe 15 and each shoe pocket 39.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. A thrust bearing for reducing vibration between a rotating collared shaft and a relatively stationary platform, comprising:
a thrust shoe carrier further comprising an inner ring, an outer ring and a plurality of radially extending members interconnecting said inner ring and said outer ring, said shoe carrier mounted in said platform with a damped spring system that simultaneously provides properties of high stiffness in radial and torsional directions with respect to said shaft and low stiffness in the axial direction of said shaft; and
a plurality of thrust shoes mounted in said carrier, said shoes adapted to apply thrust in a direction substantially along the axis of said shaft, said shoe responsive to forces from a driving system.

2. A thrust bearing as claimed in claim 1 further comprising a plurality of mounting ears radially extending from said outer ring.

3. A thrust bearing as claimed in claim 2 wherein said damped spring system is interposed between said mounting ears and said platform.

4. A thrust bearing as claimed in claim 3 wherein said damped spring system is at least one rubber isolator.

5. A thrust bearing as claimed in claim 4 wherein at least rubber isolator is interposed between each said ear and said platform.

6. A thrust bearing as claimed in claim 5 wherein each said rubber isolator further comprises a plurality of layers of rubber laminated together.

7. A thrust bearing as claimed in claim 6 wherein at least one layer of said plurality of layers has different elastic properties from at least one other layer of said plurality of layers.

8. A thrust bearing as claimed in claim 4 wherein each said rubber isolator is a slab of rubber.

9. A thrust bearing as claimed in claim 1 wherein said damped spring system further comprises a plurality of rubber slabs interposed between said shoe carrier and said platform.

10. A thrust bearing shoe carrier for positioning thrust shoes with respect to a collared shaft rotating within a stationary platform, comprising:
a shoe carrier frame further comprising:
an inner ring;
an outer ring; and
a plurality of radially extending members interconnecting said inner ring and said outer ring; and
a damped spring system attached said carrier frame, said spring system adapted for simultaneously providing properties of high stiffness in radial and torsional directions with respect to said shaft and low stiffness in the axial direction of said shaft when said shoe carrier is mounted in said platform.

11. A thrust bearing shoe carrier as claimed in claim 10 wherein said carrier frame further comprises a plurality of mounting ears radially extending from said outer ring of said carrier frame.

12. A thrust bearing shoe carrier as claimed in claim 11 wherein said damped spring system is interposed between said mounting ears and said platform.

13. A thrust bearing shoe carrier as claimed in calim 12 wherein said damped spring system is at least one rubber isolator.

14. A thrust bearing shoe carrier as claimed in claim 13 wherein at least rubber isolator is interposed between each said ear and said platform.

15. A thrust bearing shoe carrier as claimed in claim 14 wherein each said rubber isolator further comprises a plurality of layers of rubber laminated together.

16. A thrust bearing shoe carrier as claimed in claim 15 wherein at least one layer of said plurality of layers has different elastic properties from at least one other layer of said plurality of layers.

17. A thrust bearing shoe carrier as claimed in claim 13 wherein each said rubber isolator is a slab of rubber.

18. A thrust bearing shoe carrier as claimed in calim 10 wherein said damped spring system further comprises a plurality of rubber slabs interposed between said shoe carrier and said platform.

* * * * *